(12) United States Patent
Oyama et al.

(10) Patent No.: US 7,561,927 B2
(45) Date of Patent: Jul. 14, 2009

(54) NUMERICAL CONTROLLER WHICH CAN CALL PROGRAM DESCRIBED IN SCRIPT LANGUAGE

(75) Inventors: Hiroshi Oyama, Aichi (JP); Osamu Kuzuya, Aichi (JP); Yukinori Ootsubo, Aichi (JP)

(73) Assignee: Okuma Corporation, Aichi (JP)

( * ) Notice: Subject to any disclaimer, the term of this patent is extended or adjusted under 35 U.S.C. 154(b) by 490 days.

(21) Appl. No.: 11/172,487

(22) Filed: Jun. 30, 2005

(65) Prior Publication Data

US 2006/0004479 A1    Jan. 5, 2006

(30) Foreign Application Priority Data

Jul. 2, 2004    (JP) .............................. 2004-197377

(51) Int. Cl.
G05B 11/01    (2006.01)
G06F 19/00    (2006.01)
H04M 1/24    (2006.01)
G06F 9/44    (2006.01)

(52) U.S. Cl. .................... 700/23; 379/10.03; 700/169; 717/106; 717/115

(58) Field of Classification Search .................. 700/23, 700/169; 379/10.03; 717/115
See application file for complete search history.

(56) References Cited

U.S. PATENT DOCUMENTS

| 4,029,950 | A | * | 6/1977 | Haga .............................. 700/7 |
| 4,149,235 | A | * | 4/1979 | Froyd et al. .................. 700/169 |
| 4,368,511 | A | * | 1/1983 | Imazeki ...................... 700/181 |
| 4,882,670 | A | * | 11/1989 | Isobe et al. .................... 700/83 |
| 5,088,361 | A | * | 2/1992 | Kojima et al. ................ 82/127 |
| 5,436,845 | A | * | 7/1995 | Takahashi .................. 700/179 |
| 5,784,541 | A | * | 7/1998 | Ruff .......................... 700/247 |
| 5,801,942 | A | * | 9/1998 | Nixon et al. .................. 700/83 |
| 5,984,499 | A | * | 11/1999 | Nourse et al. .................. 700/5 |
| 6,056,781 | A | * | 5/2000 | Wassick et al. .............. 703/12 |
| 6,173,327 | B1 | | 1/2001 | De Borst et al. |
| 6,268,924 | B1 | | 7/2001 | Koppolu et al. |
| 6,470,223 | B1 | | 10/2002 | Naganuma |

(Continued)

FOREIGN PATENT DOCUMENTS

JP    11296359    10/1999

(Continued)

OTHER PUBLICATIONS

Merillon et al., "Devil: An IDL for Hardware Programming" Proceedings of the Fourth Symposium on Operating Systems Design and Implementation, San Diego, California, Oct. 2000, pp. 17-30.

(Continued)

Primary Examiner—Albert DeCady
Assistant Examiner—Thomas H Stevens
(74) Attorney, Agent, or Firm—Gauthier & Connors LLP

(57) ABSTRACT

A program interpreter which interprets and executes a numerical control program can recognize predetermined mnemonics (script mnemonics) prepared for instructions for setting, loading, and executing script programs. When the program interpreter recognizes the script mnemonic during interpretation and execution of the numerical control program, the program interpreter instructs execution of the script program (instance) indicated in the parameter of the mnemonic to a script engine. The script engine executes the instructed script program.

11 Claims, 15 Drawing Sheets

U.S. PATENT DOCUMENTS

| | | | |
|---|---|---|---|
| 6,775,824 B1 * | 8/2004 | Osborne et al. | 717/125 |
| 6,934,934 B1 * | 8/2005 | Osborne et al. | 717/126 |
| 6,999,842 B2 * | 2/2006 | Nagashima et al. | 700/181 |
| 7,012,706 B1 | 3/2006 | Hansen | |
| 7,058,460 B2 * | 6/2006 | Dolansky | 700/19 |
| 7,099,736 B2 * | 8/2006 | Fujishima et al. | 700/169 |
| 7,142,943 B2 * | 11/2006 | Groll et al. | 700/169 |
| 2003/0217005 A1 * | 11/2003 | Drummond et al. | 705/43 |
| 2004/0162880 A1 * | 8/2004 | Arnone et al. | 709/206 |

FOREIGN PATENT DOCUMENTS

| | | |
|---|---|---|
| JP | 2000222335 | 8/2000 |
| JP | 2001222412 | 8/2001 |
| JP | 2005-108082 | 4/2005 |
| WO | WO 01/01365 | 1/2001 |

OTHER PUBLICATIONS

Silberschatz et al., "Applied Operating System Concepts," First Edition, John Wiley & Sons, Inc., 2000; pp. 22-26, 33-41, 48-49, 259-260, 372-376, 401-405, 412-431, 506-518, 567-567, 626-627, 674-681 and 697.

Umar, Amjad, "Object-Oriented Client/Server Internet Environments," Prentice Hall PTR, 197; pp. 48-50, 104-109, 124-133 and 301-344.

Silberschatz et al., "Applied Operating System Concepts"; Copyright 2000, John Wiley & Sons, Inc.; pp. 22-26, 33-41, 48-49, 259-260, 372-376, 401-405, 412-431, 506-518, 567-569, 626-627, 674-681 and 697.

Merillon et al., "Devil: An IDL for Hardware Programming"; Campus Universitaire de Beaulieu, F-35042 Rennes Cedex, France; pp. 17-30.

* cited by examiner

```
O100
N001 SCRIPT "VBScript", VBSEngine         (DESIGNATE VBScript LANGUAGE)
N002 SLOAD "sendmail.vbs", VBSEngine      (LOAD INSTRUCTION OF SCRIPT LANGUAGE FILE)
N003 SCRIPT "JScript", JSEngine           (DESIGNATE JScript LANGUAGE)
N004 SLOAD "scriptlibrary.js", JSEngine   (LOAD INSTRUCTION OF SCRIPT LANGUAGE)
N005 SEVENT ALARM, "ALARMMAIL", VBSEngine (DESIGNATE SCRIPT WHEN ALARM OCCURS)
N006 G0 Z1000                             (RAPID TRAVERSE INSTRUCTION)
N007 T2 M6                                (TOOL EXCHANGE INSTRUCTION)
N008 SCALLE "RECORDTOOL", JSEngine        (CALL TOOL EXCHANGE SCRIPT)
N009 M41 S3000                            (SPINDLE ROTATION INSTRUCTION)
N010 X0 Y0                                (RAPID TRAVERSE INSTRUCTION)
N011 Z80                                  (SAME AS ABOVE)
N012 SCALL "GETFEED", JSEngine            (CALCULATE FEED RATE AND WRITE IN COMMON VARIABLE VC001)
N013 G1 X100 F=VC001                      (MACHINING FEED INSTRUCTION)
N014 SCALL "DOFIXEDCYCLE", JSEngine       (EXECUTE FIXED CYCLE)

(OMITTED)

N074 G0 Z1000                             (RAPID TRAVERSE INSTRUCTION)
N075 SCALLS "FINISHMAIL", VBSEngine       (CALL MAIL SENDING SCRIPT)
M076 M02                                  (COMPLETION OF PROGRAM)
```

Fig. 2

```
// scriptlibrary.js
function RECORDTOOL()              // RECORD TOOL ON DATABASE
{
    var con = new ActiveXObject ("ADODB.Connection.2.0");
    var cmn = new ActiveXObject ("ADODB.Command");
    con.Open("DSN=TOOLDB;UID=admin;PWD=;");              // CONNECT TO DATABASE
    cmn.ActiveConnection = con;
    cmn.CommandText = "INSERT INTO TOOLRECORD (ToolName, Number) VALUES ('MILL', 2)";
    cmn.Execute();                                       // EXECUTE ADDITION OF RECORD
} function GETFEED()              // READ FEED RATE FROM DATABASE
{
    var conn = new ActiveXObject("ADODB.Connection");
    var rs = new ActiveXObject("ADODB.Recordset");
    conn.Open ("Provider=MSDASQL;Data Source= DSN-FOR-PRACTICING-ODBC");
    rs.Open ("SELECT * FROM FEEDRATE WHERE NAME = '0100' AND STEP = 1", conn);
    var feed = rs.Fields('FEEDRATE');
    rs.Close ();
    conn.Close();
    nc.SetCommonVar ( 1, feed );              // WRITE IN COMMON VARIABLE
} function DOFIXEDCYCLE()              // EXECUTE FIXED CYCLE
{
    nc.ExecuteBlock ("G81 Z0 R50 P1 F100");              // EXECUTE 1 BLOCK var cycle = nc.GetCommonVar(2);
    var block = "G" & cycle & " Z0 R50 P1 F" & feed;
    nc.ExecuteBlock(block);              // EXECUTE 1 BLOCK
}
```

Fig. 3

```
'sendmail.vbs
Sub ALARMMAIL()
    sendmail ("NC Notice", "Alarm Occured!");
End Sub Sub FINISHMAIL()
    sendmail ("NC Notice", "0100:Finished");
End Sub Sub sendmail (subject, message)    'SEND MAIL subject      = subject
    m_message    = message
    Set bobj     = new ActiveXObject ("mailer")     'CREATE MAILER OBJECT
    bobj.Env     = "IUSR_MACHINE: mailserver"       'DESIGNATE SMTP SERVER
    bobj.mailfrom = "from@mail.from"                'MAIL ADDRESS OF ORIGIN
    mailto       = "to@mail.to"                     'MAIL ADDRESS OF DESTINATION rc = bobj.sendmail(mailto,subj,m_message)       'EXECUTE SENDING METHOD End Sub
```

Fig. 4

```
O100
N006 G0 Z1000                                    (RAPID TRAVERSE INSTRUCTION)
N007 T2 M6                                       (TOOL EXCHANGE INSTRUCTION)
<? script="JScript" engine="JSEngine"
   // RECORD TOOL ON DATABASE
   var con = new ActiveXObject("ADODB.Connection.2.0");
   var cmn = new ActiveXObject("ADODB.Command");
   con.Open ("DSN=TOOLDB;UID=admin;PWD=;" );            // CONNECT TO DATABASE
   cmn.ActiveConnection = con;
   cmn. CommandText = "INSERT INTO TOOLRECORD (ToolName,Numer) VALUES ('MILL',2)";
   cmn.Execute ();
?>                                               // EXECUTE ADDITION OF RECORD
N009 M41 S3000                                   (SPINDLE ROTATION INSTRUCTION)
N010 X0 Y0                                       (RAPID TRAVERSE INSTRUCTION)
N011 X80                                         (SAME AS ABOVE)
N013 G1 X100 F=1000                              (MACHINING FEED INSTRUCTION)
...
N074 G0 Z1000                                    (RAPID TRAVERSE INSTRUCTION)
N076 M02                                         (COMPLETION OF PROGRAM)
```

Fig. 9

```
O100
N006 G0 Z1000                  (TEMP.MIN)
N007 T2 M6                     (RAPID TRAVERSE INSTRUCTION)
SCRIPT JScript,JSEngine        (TOOL EXCHANGE INSTRUCTION)
SLOAD TEMP.js,JSEngine
SCALL JSFunc0,JSEngine
N009 M41 S3000                 (SPINDLE ROTATION INSTRUCTION)
N010 X0 Y0                     (RAPID TRAVERSE INSTRUCTION)
N011 Z80                       (SAME AS ABOVE)
N013 G1 X100 F=1000            (MACHINING FEED INSTRUCTION)
...
N074 G0 Z1000                  (RAPID TRAVERSE INSTRUCTION)
N076 M02                       (COMPLETION OF PROGRAM)
```

Fig. 10

```
// TEMP.js
function JSFunc0() {
    // RECORD TOOL ON DATABASE
    var con = new ActiveXObject("ADODB.Connection.2.0");
    var cmn = new ActiveXObject("ADODB.Command");
    con.Open ("DSN=TOOLDB;UID=admin;PWD=;");           // CONNECT TO DATABASE
    cmn.ActiveConnection = con;
    cmn.CommandText = "INSERT INTO TOOLRECORD (ToolName, Numer) VALUES ('MILL',2)";
    cmn.Execute ();                                     // EXECUTE ADDITION OF RECORD
}
```

Fig. 11

```
interface INc :IDispatch
{
    HRESULT NcCommonVariable([in,string]BSTR nc_var, [out,retval]double*pVal);
    HRESULT NcCommonVariable([in,string]BSTR nc_var, [in,string]BSTR newVal);
    HRESULT NcSystemVariable([in,string]BSTR nc_var);
    HRESULT NcSystemVariable([in,string]BSTR nc_var);
    HRESULT ExecuteBlock([in,string]BSTR block);
};
```

Fig. 15

NUMERICAL CONTROLLER WHICH CAN CALL PROGRAM DESCRIBED IN SCRIPT LANGUAGE

PRIORITY INFORMATION

This application claims priority to Japanese Patent Application No. 2004-197377, filed Jul. 2, 2004, which is incorporated herein by reference in its entirety.

BACKGROUND OF THE INVENTION

1. Field of the Invention

The present invention relates to a numerical controller which controls a machine tool by driving a servo device or the like based on a numerical control program.

2. Description of the Related Art

As use of personal computers ("PC") has become widespread, use of numerical controllers ("NC") based on PCs has also grown. A PC is effective in introducing information technologies into a machining site as PC may be installed with various applications, for example, for production management, design and drawing, and automatic programming. However, heretofore the fact that these applications can be used on a PC-based NC simply meant that the PC and NC are provided in the same housing and did not mean integrally combination of the PC and NC.

In a PC, on the other hand, a script engine function is provided as a means for easily providing an automation function by an end user. The script engine function allows creation and execution of a program without requiring an in-depth knowledge of programming using an easy grammar similar to the numerical control program of the NC which is called a "script language". This technique is often used for extending a web browser function and a web server function. In addition to these usages, the technique can also be used in a spreadsheet application and for creating an independent application and allows easy automation of processes even when the user is not a professional programmer.

SUMMARY OF THE INVENTION

The present invention was made in view of the above-described circumstances and advantageously allows calling and execution of a program described in a script language from a numerical control program.

According to one aspect of the present invention, there is provided a numerical controller which controls a machine tool based on a numerical control program, the numerical controller comprising a numerical control program execution section which executes a numerical control program, and a script calling section which calls a script program described in a script language from the numerical control program during execution of the numerical control program by the numerical control program execution section.

According to another aspect of the present invention, it is preferable that, in the numerical controller, the script calling section is realized as a part of the numerical control program execution section, the script calling section can recognize one or more predetermined script instructions, and, when the script calling section recognizes a script instruction from a numerical control program during execution of the numerical control program, the script calling section calls a script program indicated by a parameter attached to the recognized script instruction.

According to another aspect of the present invention, it is preferable that, in the numerical controller, the one or more predetermined script instructions include at least one of an instruction in an asynchronous start mode in which calling of the script program is started without waiting for completion of a block immediately before the calling of the script program and an instruction in an asynchronous resume mode in which an operation of a block which follows the block which calls a script program is started before the calling of the script program is completed.

According to another aspect of the present invention, it is preferable that, in the numerical controller, the script calling section is realized as a part of the numerical control program execution section, the script calling section can recognize a start tag which indicates start of a script program and an end tag which indicates an end of a script program, and, when the script calling section recognizes a start tag from a numerical control program during execution of the numerical control program, the script calling section extracts a description from the start tag to a next end tag as a script program and calls the extracted script program.

According to another aspect of the present invention, it is preferable that, in the numerical controller, a script engine section which executes a script program called by the script calling section comprises a section which instructs the numerical control program execution section to execute a partial program described in a language for describing the numerical control program.

According to another aspect of the present invention, it is preferable that, in the numerical controller, a script engine section which executes a script program is provided separately from the numerical control program execution section.

According to another aspect of the present invention, it is preferable that, in the numerical controller, the script engine section can generate a plurality of script engine instances and a script program which is described in a plurality of different script languages can be called in a numerical control program.

According to another aspect of the present invention, it is preferable that, in the numerical controller, the numerical control program execution section operates on a real-time operating system and the script engine section operates on a general-purpose operating system.

According to another aspect of the present invention, it is preferable that, in the numerical controller, a function of the numerical control program execution section which operates on the real-time operating system can be called from a script program using a component mechanism.

According to another aspect of the present invention, it is preferable that the numerical controller further comprises a script engine section which executes a script program which is called by the script calling section, wherein the script calling section can recognize an event-driven script instruction for registering a script program which operates when an event occurs, when the script calling section recognizes the event-driven script instruction from the numerical control program, the script calling section recognizes an event and a script program designated in a parameter of the recognized event-driven script instruction and calls the recognized script program with designation of the recognized event as an execution condition, and when an event is designated as an execution condition in the called script program, the script engine section executes the script program when the script engine section receives a notification indicating occurrence of the event.

According to another aspect of the present invention, there is provided a numerical controller which controls a machine by driving a servo device or the like based on a numerical control program, wherein a script program described in a script language which operates when an event occurs can be designated, and when the event occurs, the designated script program is executed.

BRIEF DESCRIPTION OF THE DRAWINGS

A preferred embodiment of the present invention will be described in detail based on the following drawings, wherein:

FIG. 2 is a diagram exemplifying a numerical control program in a preferred embodiment of the present invention;

FIG. 3 is a diagram exemplifying a script language program using a JScript language;

FIG. 4 is a diagram exemplifying a script language program using a VBScript language;

FIG. 9 is a diagram exemplifying a second numerical control program according to a preferred embodiment of the present invention;

FIG. 10 is a diagram exemplifying a temporary file for a numerical control program;

FIG. 11 is a diagram exemplifying a temporary file for a script program;

FIG. 15 is a diagram showing an excerpt of an interface definition (IDL file) of an NC component.

DESCRIPTION OF PREFERRED EMBODIMENT

Figure 1:
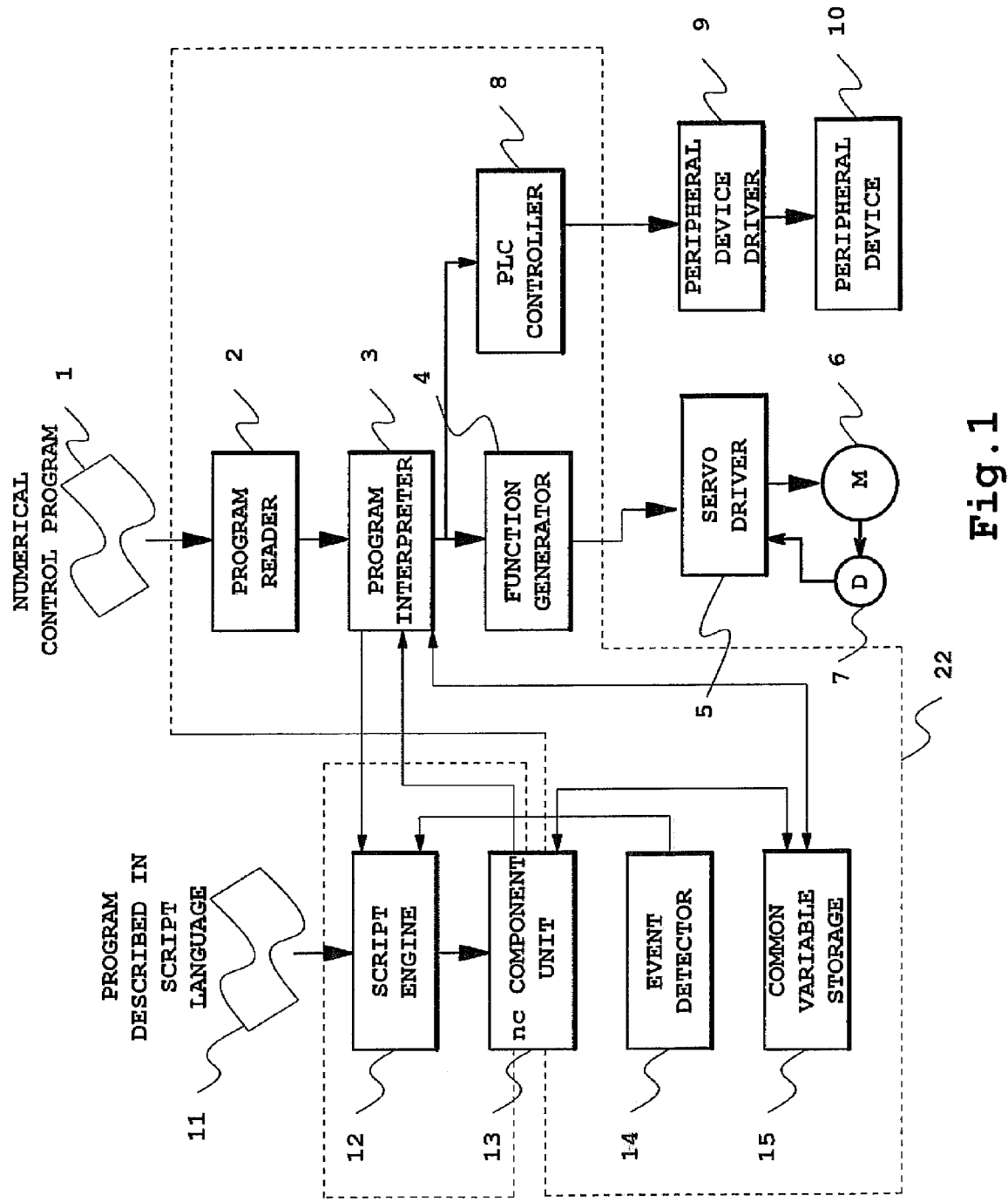
FIG. 1 is a diagram showing a structure of a numerical controller according to a preferred embodiment of the present invention.

FIG. 1 is a block diagram showing a numerical controller according to a preferred embodiment of the present invention. A numerical control program 1 is a program for controlling an operation of a target to be controlled by the numerical controller, for example, various servo devices provided in a machining device. The numerical control program 1 is read by a program reader 2 block by block and is sent to a program interpreter 3. The program interpreter 3 interprets the received program and executes the program. During interpretation and execution of the numerical control program, a function and a sequence for control are called as necessary. A function generator 4 generates a function based on an interpretation result by the program interpreter 3. A servo drive 5 drives a servo motor 6 based on the generated function to operate a machine tool (not shown). A position detector 7 detects a rotational state of the servo motor 6 and feedbacks the rotational state to the servo driver 5 to allow a servo control. A PLC (programmable logic control) controller 8 applies a PLC control operation based on the sequence called in the interpretation of the program by the program interpreter 3 and execution of the program. A peripheral device driver 9 drives a peripheral device 10 such as a spindle and a tool changer.

The processing mechanism of the numerical control program 1 described above is similar to the processing mechanism of a PC-based NC in the related art. Next, a mechanism of the present embodiment which is not present in the PC-based NC in the related art will be described.

A script engine 12 loads a program 11 described in a script language (hereinafter simply referred to as "script program") and executes the loaded program. With the execution of the script program, for example, database software and mail sending software (not shown) are driven.

Referring now to FIG. 2, an example of a numerical control program which can be processed by the numerical controller according to the present embodiment will be described. The exemplified numerical control program is a program in which mnemonics such as SCRIPT (for designating a script language), SLOAD (for loading a script program), SCALL (for calling a script), SCALLS (for calling a script of "asynchronous start" mode), SCALLE (for calling a script of "asynchronous resume" mode), and SEVENT (for defining an event) are added to G code which is widely in use in the related art for description of numerical control programs as mnemonics for an instruction to request execution to the script engine 12. Here, "asynchronous start" mode refers to a mode in which a script instruction designated by the mnemonic is started regardless of (that is, asynchronously from) the previous process (block) in the numerical control program. In other words, when a script instruction of the asynchronous start mode is present in the numerical control program, processing of this script instruction is started without waiting for completion of execution of the previous block. Processing of a script instruction which is not in the asynchronous start mode (that is, a script instruction of a "synchronous start" mode), on the other hand, is started after the execution of the previous block is completed.

The "asynchronous resume" mode is a mode in which an operation of the block after a script instruction is started asynchronously with the execution of the script instruction designated by the mnemonic. In other words, when a script instruction of the asynchronous resume mode is present in the numerical control program, processing of a following block is started without waiting for the completion of the execution of the script instruction. In the case of a script instruction which is not in the asynchronous resume mode (that is, a script instruction of "synchronous resume" mode), on the other hand, processing of the following block is started after the execution of the script instruction is completed.

These mnemonics have the following calling form:
SCRIPT [name of language], [name of engine instance]
SLOAD [name of script file], [name of engine instance]
SCALL [name of function], [name of engine instance]
SCALLS [name of function], [name of engine instance]
SCALLE [name of function], [name of engine instance]
SEVENT [type of event], [name of function], [name of engine instance]

Here, the "name of language" is a name of a programming language (script language) such as VBScript and JScript. "VBScript" is an abbreviation for Microsoft (registered trademark) Visual Basic (registered trademark) Script Edition sold by Microsoft Corporation of the United States. "JScript" is a script language developed by Microsoft Corporation which is compatible with Java (registered trademark) Script.

The "name of engine instance" is the name of a script engine instance which executes the script program. More specifically, a script engine 12 of the present embodiment generates a script engine instance for processing of each individual script program and the generated instance executes the script process. By employing a configuration in which a script engine instance is generated for each process, it is possible to allow the use of different languages in one numerical control program and to switch between engine instances to avoid collision of names in script programs called from a main program and of a script programs called from a sub-program.

The "name of function" designates a name of a function or a sub-program of a program described in the script language. The "type of event" designates a type of event detected by the event detector 14 such as, for example, selection of a numerical control program (PSELECT), start (START), end (END), generation of alarm (ALARM), and resetting of NC (RESET).

Figure 5:
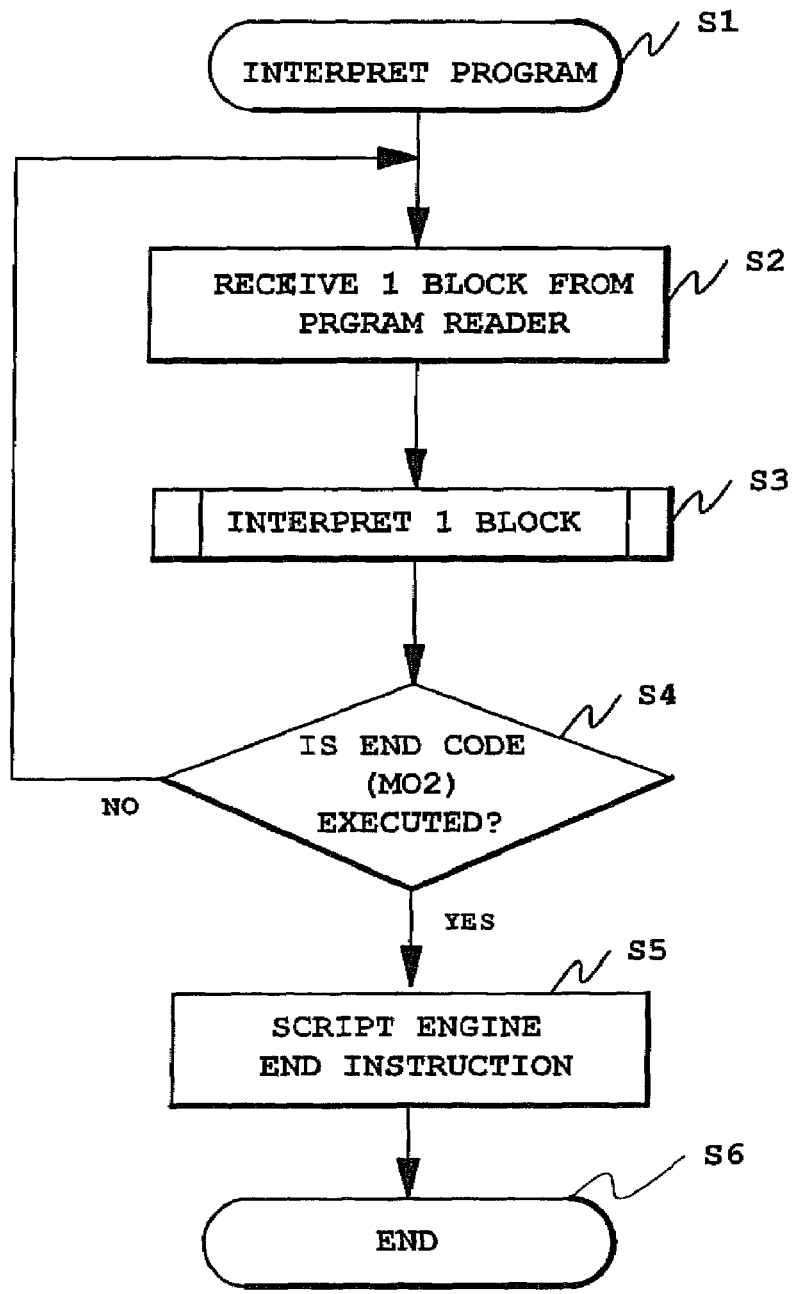
FIG. 5 is a flowchart showing an operation of a program interpreter.
Figure 6:
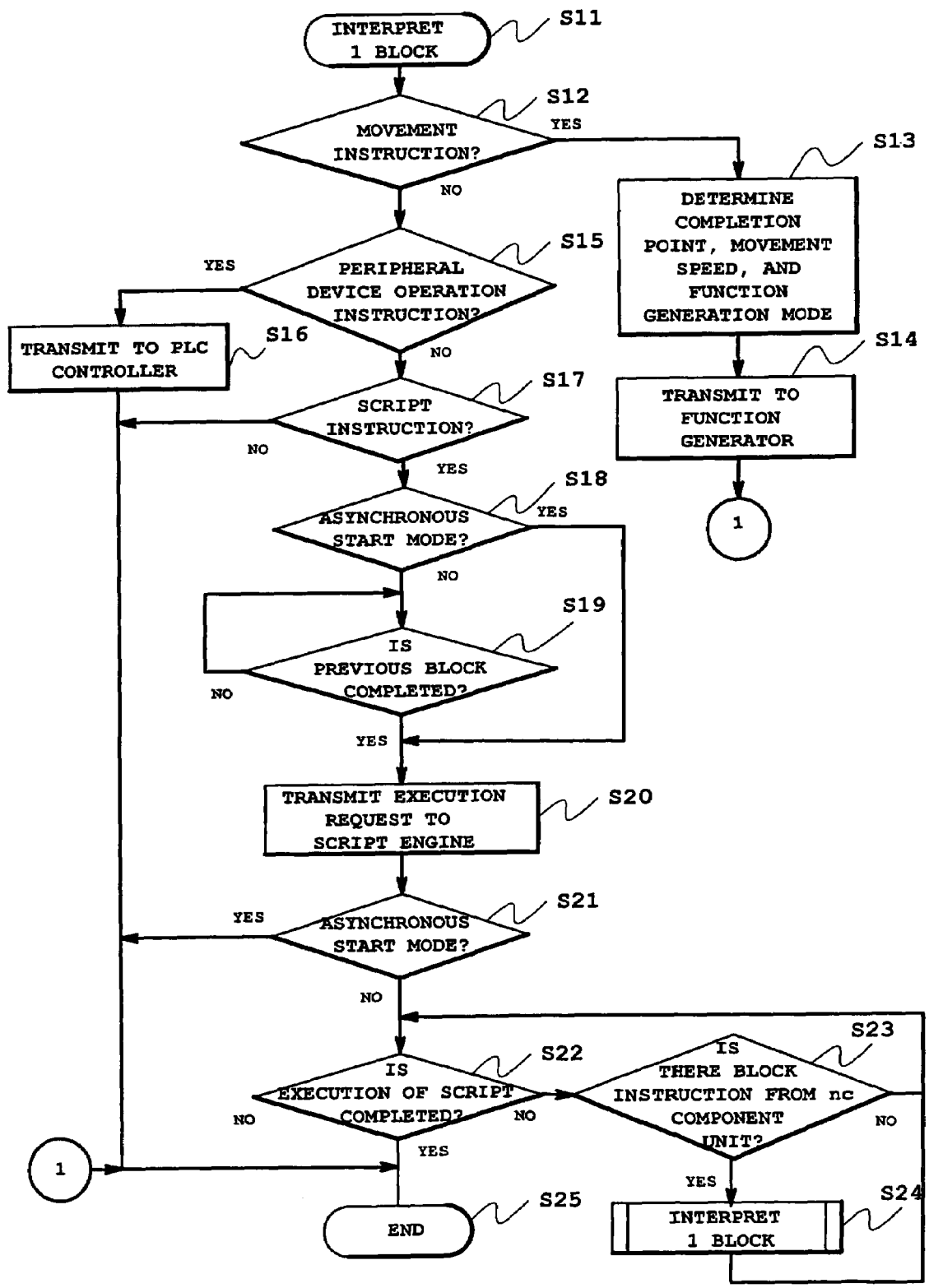
FIG. 6 is a flowchart showing an operation of a program interpreter (interpretation of 1 block)

An operation of the program interpreter 3 will now be described referring to the flowcharts of FIGS. 5 and 6 and exemplifying the numerical control program shown in FIG. 2.

The numerical control program shown in FIG. 2 will be briefly described. This program generates a script engine instance (having a name of instance of "VBSEngine") of VBScript in a block of sequence name N001 and loads a script program called "sendmail.vbs" to the instance at the next sequence N002. The script "sendmail.vbs" is a script for sending a mail. FIG. 4 shows an example of description of the"sendmail.vbs" script. Then, in sequence N003, a script engine instance JSEngine of JScript is generated and a script called "scriptlibrary.js" is loaded to the instance at sequence N004. The script "scriptlibrary.js" is a script program which describes functions indicating various processes for which execution is desired during numerical control machining and FIG. 3 shows an example of the code description. Next, in sequence N005, a function "ALARMMAIL" which is executed when an alarm generating event occurs and a script engine instance "VBSEngine" which executes the function of "ALARMMAIL" (the script engine instance of "VBSEngine" also executes the senmail.vbs script) are stored. Then, in sequences N006 and N007, an NC instruction such as movement and exchange of tools are executed. In sequence N008, a script engine instance JSEngine is called to record the information of tool exchange in the sequence N007 and the engine executes a function "RECORDTOOL". In sequences N009, N010, and N011, an NC instruction such as spindle rotation and rapid traverse are executed and JSEngine is called in sequence N012 to calculate the feed rate in the execution of the NC instruction and record in a database. In sequence N013, a machining feed instruction is executed. In sequence N014, a function of "DOFIXEDCYCLE" in the script program "scriptlibrary.js" shown in FIG. 3 is called and a control of machining operation in a fixed cycle indicated by the function is executed. Then, in sequence N075, the engine VBSEngine for the mail sending script is called to send a mail indicating the completion of the numerical control program and the numerical control program is completed by a completion instruction in sequence N076.

To execute such a numerical control program, when the process is started by the program interpreter 3 (step S1), the program interpreter 3 receives one block in the numerical control program from the program reader 2 (step S2) and interprets the received block (step S3). Thus, interpretation of the block is started by a sub-program (step S11). When the received block is a movement instruction such as the blocks of the sequence names N006, N010, and N013 shown in FIG. 2 (step S12), a function generation mode such as a completion point, movement speed, line, and arc is calculated (step S13) and these information are transmitted to the function generator 4 (step S14) to generate a function. The function generator 4 transmits a speed instruction signal to the servo driver 5. The servo driver 5 controls the servo motor 6 while receiving a feedback signal from the detector 7 so that the servo motor 6 operates at the instructed speed based on the speed instruction signal.

The program interpreter 3 interprets the program in a unit of a received block. When the block is an instruction for a peripheral device such as the block in the sequence names N007 and N009 of FIG. 2 (step S15), a peripheral device operation instruction is transmitted to the PLC controller 8 (step S16). The PLC controller 8 sends a drive signal to the peripheral device driver 9 and drives the peripheral device 10 such as a tool exchanger and spindle.

The program interpreter 3 also interprets the program in a unit of a received block and, when the block is a script instruction such as the blocks of sequence names N001-N005, N008, N014, and N075 (step S17), it is determined whether or not the script instruction is in the "asynchronous start" mode (step S18). When the script instruction is not in the asynchronous start mode (that is, the script instruction is in the synchronous start mode), the program interpreter 3 waits for the completion of the previous block (step S19). When the previous block is completed, the program interpreter 3 sends an execution request of the script instruction to the script engine 12 (step S20).

For the block with sequence name N075, because this block is a SCALLS instruction and in the asynchronous start mode in which execution does not await completion of execution of the previous block, step S19 is skipped. In other words, the script is executed while the rapid traverse instruction in the previous block of N074 is not completed and the process proceeds to the step S20. Then, an execution request is sent to the script engine 12 (step S20).

After request for execution of a script instruction is sent to the script engine 12, it is determined whether or not the script instruction is in the asynchronous resume mode (step S21). When it is determined that the script instruction is not in the asynchronous resume mode, the program interpreter 3 waits for completion of execution of the script instruction (step S22). When, on the other hand, it is determined that the script instruction is in the asynchronous resume mode, the process proceeds to step S25 without waiting for completion of execution of the script instruction. For example, because the block of N008 is a SCALLE instruction in the asynchronous resume mode which does not wait for completion of execution of the script, step S22 is skipped and the process proceeds to step S25 and interpretation of this block is completed. When completion of the script is to be waited in step S22 (that is, when the script is not in the asynchronous resume mode), processing of the following block is not started until the execution of the script is completed.

Even when the block is a block of a script instruction which is not in the asynchronous resume mode, when an execution of a block described in a G code is instructed from inside of the script program indicated by the script instruction, the block instructed from the inside of the script program is executed even when the execution of the process corresponding to the script instruction is not completed. Such a calling of a G code block from inside of the script program is realized by an NC component unit 13.

More specifically, even when it is determined in step S22 that the execution of the script is not completed, if execution of a block is requested from the NC component unit 13 (Step S23), the requested block is interpreted (step S24). The processing of the block is realized by recursively calling step S11. The structure and processing related to the NC component unit 13 will be described later in more detail.

When interpretation of one block is completed in step S25, the procedure returns to step S4 and it is determined whether or not a return end code (M02) is executed (step S4). If the process is not completed, the steps from step S2 are repeated. If, on the other hand, the process is completed, an end instruction is sent also to the script engine (step S5) and program interpretation is completed (step S6).

In the description above, the spindle move instruction, the peripheral device operation instruction, and script instruction are described as being separate entries in various blocks for ease of explanation, but the present invention is not limited to such a configuration and these instructions may be mixed and described in one block. In addition, the mnemonic and calling method are only exemplary and may differ from those described above.

Figure 7:
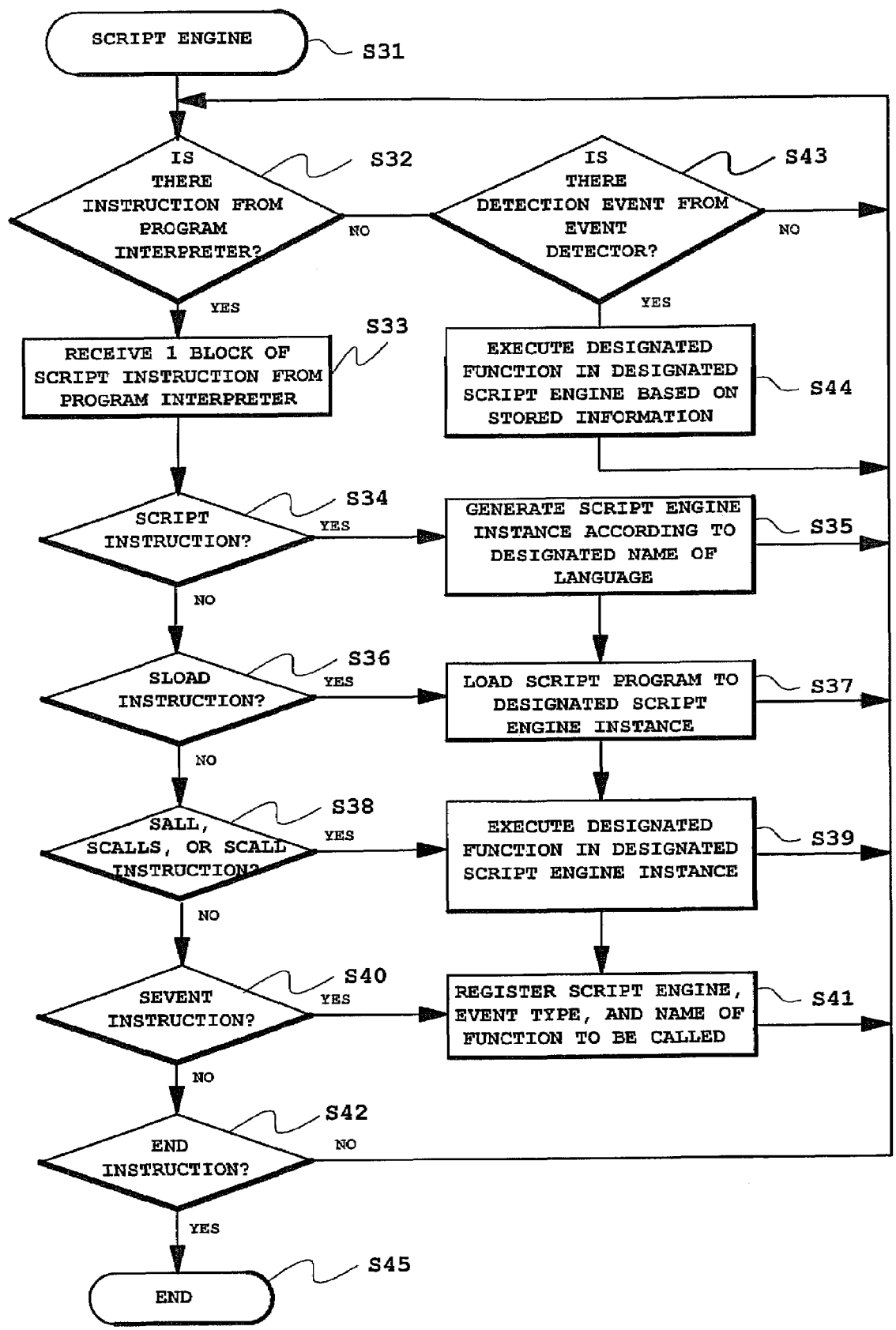
FIG. 7 is a flowchart showing an operation of a script engine.

Next, an operation of the script engine 12 will be described based on a flowchart of FIG. 7. An operation of the script engine 12 is started when the interpretation of the numerical control program is started (step S31) and it is examined whether there is a script instruction from the program interpreter 3 (step S32) or a detection event from the event detector 14 (step S43). If, in the examination, a script instruction is found in the execution in step S20 by the program interpreter 3, one block of script instruction is received from the program interpreter 3 (step S33).

When the received script instruction is "SCRIPT" (step S34), a script engine instance is generated according to the designated language name (step S35).

When the received script instruction is "SLOAD" (Step S36), a script program is loaded to the designated script engine instance (step S37).

When the received script instruction is one of "SCALL", "SCALLS", and "SCALLE" (step S38), a function having the designated function name is called and executed by the designated script engine instance (step S39). The difference in operations among SCALL, SCALLS, and SCALLE is achieved by the program interpreter 3.

When the received script instruction is "SEVENT" (step S40), the event type, the designated script engine instance, and a function having the designated function name which are designated as parameters in the instruction are registered (step S41).

When the received script instruction is an end instruction sent in step S5 (step S42), the process is completed (step S45).

At step S43, whether or not an event of a detection target such as PSELECT, ALARM, START, END, and RESET is detected in the event detector 14 is determined, and, when such an event is detected, a designated function is executed by a designated script engine based on information stored in step S41 in advance (step S44).

A second example of a numerical control program shown in FIG. 9 will now be described. In the numerical control program exemplified in FIG. 2, various mnemonics are introduced for execution of the script instruction. In the numerical control program exemplified in FIG. 9, on the other hand, a program is directly described in the script language and mixed within the numerical control program of G code. When such a mixed description is used, there is an advantage that the overall flow can more easily be grasped than when the numerical control program and the script program are separately described as in FIGS. 2-4.

In the program exemplified in FIG. 9, the beginning of script language is indicated by a "<?" tag, and the end of the script language is then indicated by a "?>" tag.

The program interpreter 3 for processing the program exemplified in FIG. 2 is realized by adding a function to interpret the above-described mnemonics for script processing to the program interpreter of a PC-based NC in the related art. When, on the other hand, the program exemplified in FIG. 9 is to be processed, the program interpreter 3 can be obtained by expanding the function of the interpreter 3 of the related art to have a function to recognize start and end of the script description by tags and send the script description between the start and end to the script engine 12.

Figure 8:
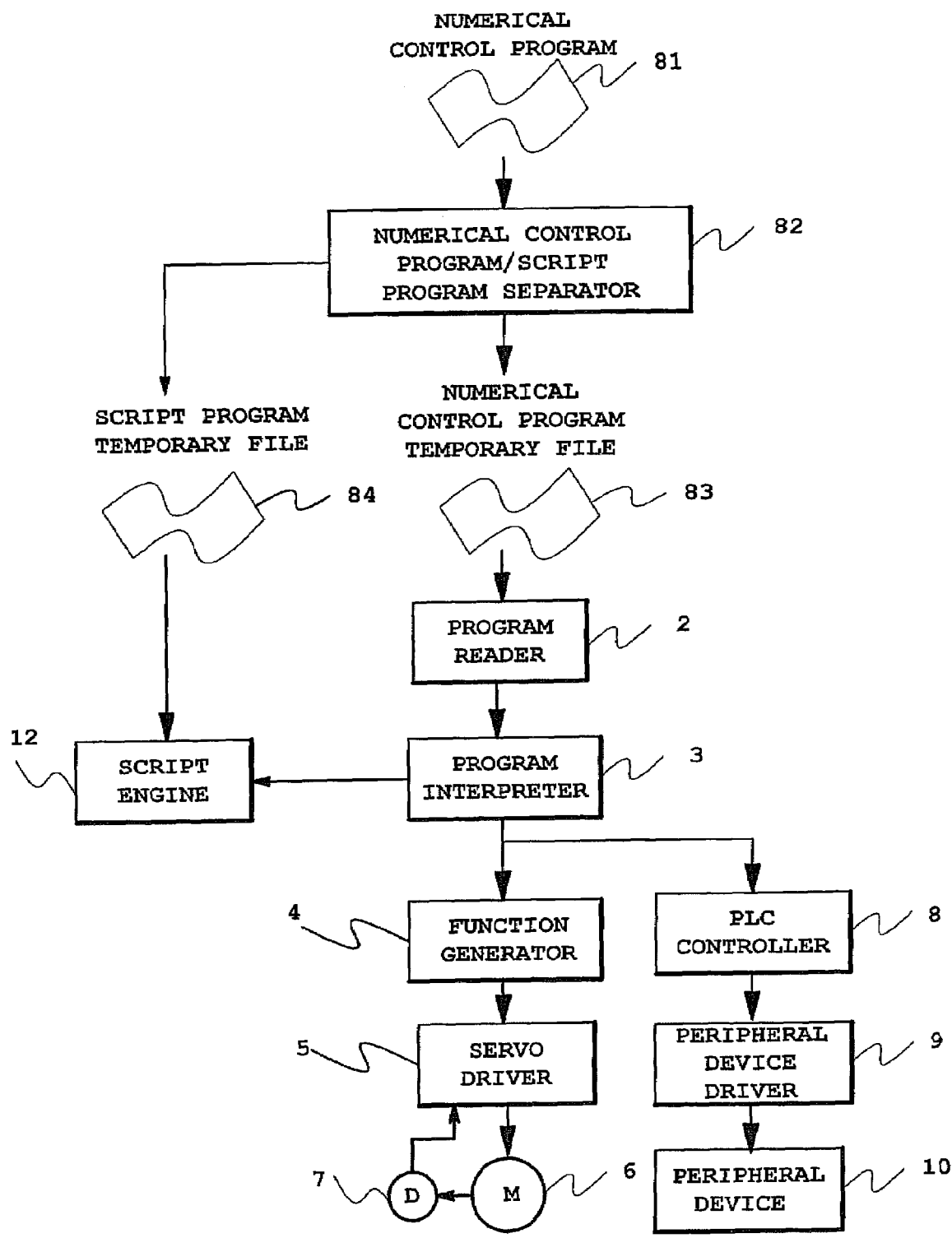
FIG. 8 is a diagram showing a structure of a second numerical controller according to a preferred embodiment of the present invention.

FIG. 8 is a diagram showing a structure of a numerical controller which can interpret and execute the numerical control program exemplified in FIG. 9. In FIG. 8, components which function similarly to the components in FIG. 1 are assigned the same reference numerals and will not described again, while components having the same name but different functions are assigned different reference numerals.

A numerical control program 81 is a numerical control program in which a G code program and a script program are mixed and described similar to the numerical control program exemplified in FIG. 9. A numerical control program/script program separator 82 separates the numerical control program 81 into a temporary file 83 for numerical control program (numerical control program temporary file) made of the G code and mnemonics and a temporary file 84 for a script program (script program temporary file) (an example of which is shown in FIG. 11). A text string described from a start tag to a corresponding end tag in the numerical control program 81 becomes one script program temporary file 84. There may be cases in which a plurality of script programs are described in the numerical control program 81. In such cases, each of the script programs is extracted and forms a temporary file. By setting these files as the input files for the program reader 2 and the script engine 12, it is possible to use structures common with the numerical controller of FIG. 1.

Figure 12:
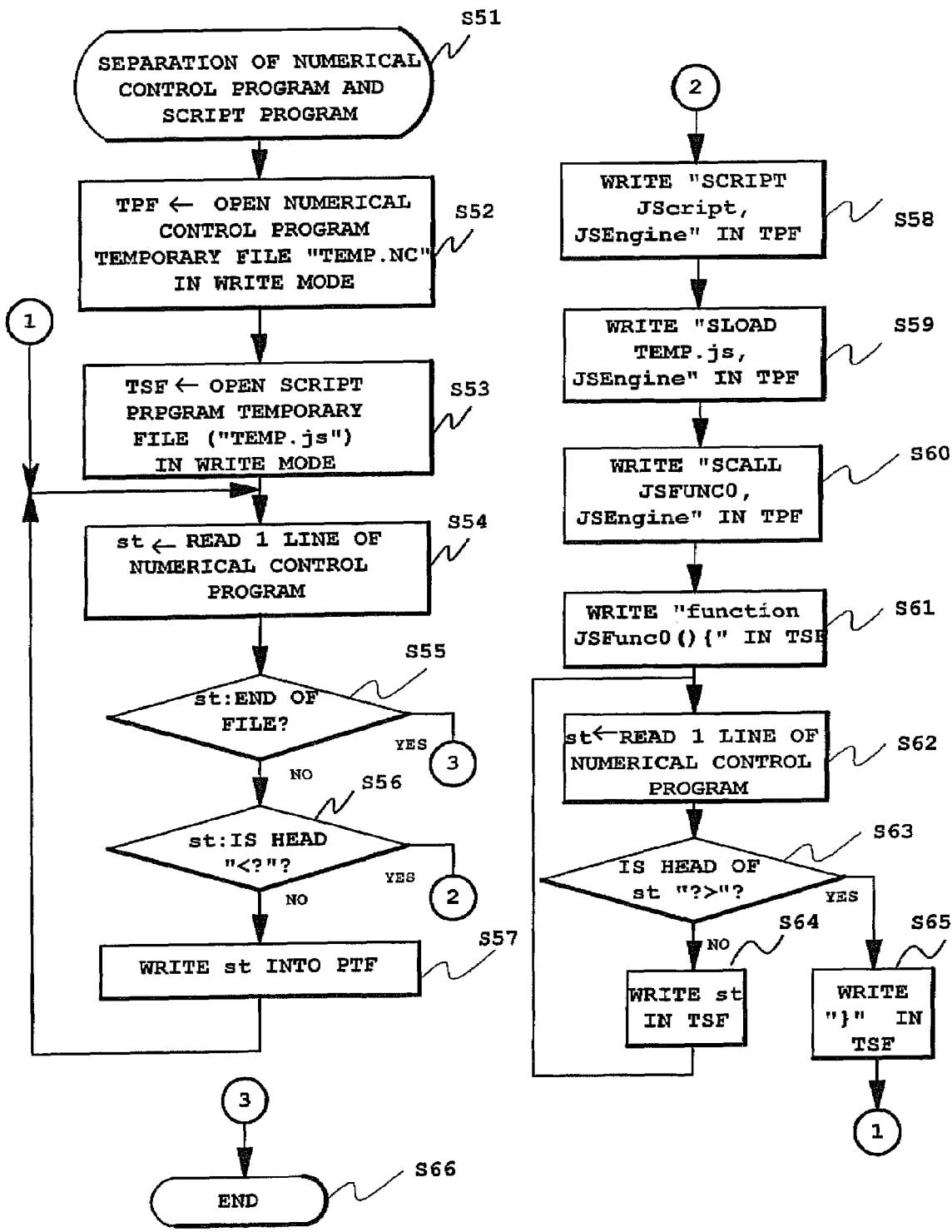
FIG. 12 is a flowchart showing an operation of a numerical control program/script program separator.

FIG. 12 shows a flowchart of a procedure for the numerical control program/script program separator 82 to separate the numerical control program 81 (shown in FIG. 9) into the numerical control program temporary file 83 (shown in FIG. 10) and the script program temporary file 84 (shown in FIG. 11).

When separation of the numerical control program and the script program is started (step S51), the numerical control program temporary file 83 (in the illustrated example, having a name of "TEMP.NC") is opened in a write mode and the opened file is set as a temporary file TPF (step S52). Then, the script program temporary file 84 (in the illustrated example, having a name of "TEMP.js") is opened in a write mode and the opened file is set as a temporary file TSF (step S53).

One line of the numerical control program 81 is read and substituted into a variable st (step S54). If the variable st indicates an end of the file (step S55), separation is completed (step S66).

A "<?" at the head of the variable st (step S56) indicates the start of the script program, and, therefore, a process from step S58 is executed. Otherwise, the head indicates a G code numerical control program, and the variable st is written into the numerical control program temporary file 83, that is, TPF (step S57) and the process from step S54 is repeated.

When the head of the variable st is determined as "<?" in step S56, three lines of "SCRIPT JScript,JSEngine", "SLOAD TEMP.js,JSEngine", and "SCALL JPFunc0,JSEngine" are written in the numerical control program temporary file 83, that is, TPF (steps S58-S60). This is a process to replace the script directly described in the numerical control program 81 into a description equivalent to the description using mnemonics for the script illustrated in FIG. 2. As the type of the script language and the name of the script engine instance, it is possible to use those shown in the script description in the numerical control program 81 (fourth line in FIG. 9). The name of function JSFunc0 may be automatically generated. Then, "function JSFunc0( ) {" is written to the script temporary file 84, that is, TSF (step S61), in order to correlate a name of a function designated in the mnemonic in the numerical control program temporary file 83 and the actual function described in the script temporary file 84. A description of one line is read from the numerical control program 81 into a variable st (step S62). When the head of the variable st is "?>", the variable st indicates an end of the script program (step S63) and the process proceeds to step S65. Otherwise, the variable st is written to the script temporary file 84, that is, TSF (step S64) and a process from step S62 is repeated. When the end of the script program is reached, "}" which indicates the end of the function is written to the script temporary file 84, that is, TSF, and the process from step S54 is repeated.

In this manner, the numerical control program 81 is separated into the numerical control program temporary file 83 and the script program temporary file 84, and, by using the separated files as the input for the numerical control program interpreter 3 and the script engine 12, it is possible to realize a numerical controller which interprets and executes a numerical control program shown in FIG. 9 in which G code and script program are mixed and described, using a numerical controller explained with reference to FIG. 1.

In the above-described embodiment, the start and end of the script program are indicated by "<?" and "?>", respectively, but the present invention is not limited to this configuration and other symbols may be used. Although in the example configuration shown in FIGS. 9-12, limitations such as that only one or less script description appears in the numerical control program, that only JScript is used as the script language, that only one script engine instance is used, and that function definition is prohibited are present in the numerical control program 81, removing these limitations is a natural expansion within the scope of the present invention.

In the description of the present embodiment, JScript and VBScript are described as example script languages, but, in addition to these script languages, it is possible to use languages such as Java (registered trademark) script, Perl, Ruby, or the like, or to use a shell script by a shell such as B-shell, C-shell, or the like, used in UNIX (registered trademark) and Windows (registered trademark). In addition, although an argument and a return value of the script program are not handled in the preferred embodiment of the present invention, it is also possible to easily configure the structure to handle these values. Moreover, as the numerical control program, in addition to the simple numerical control program illustrated in the drawings, there are programs in which one or a plurality of sub-programs are called from a main program. It is also possible to configure the structure to call a program described in a script language from both the main program and the sub-program and these cases are also within the scope of the present invention.

Figure 13:
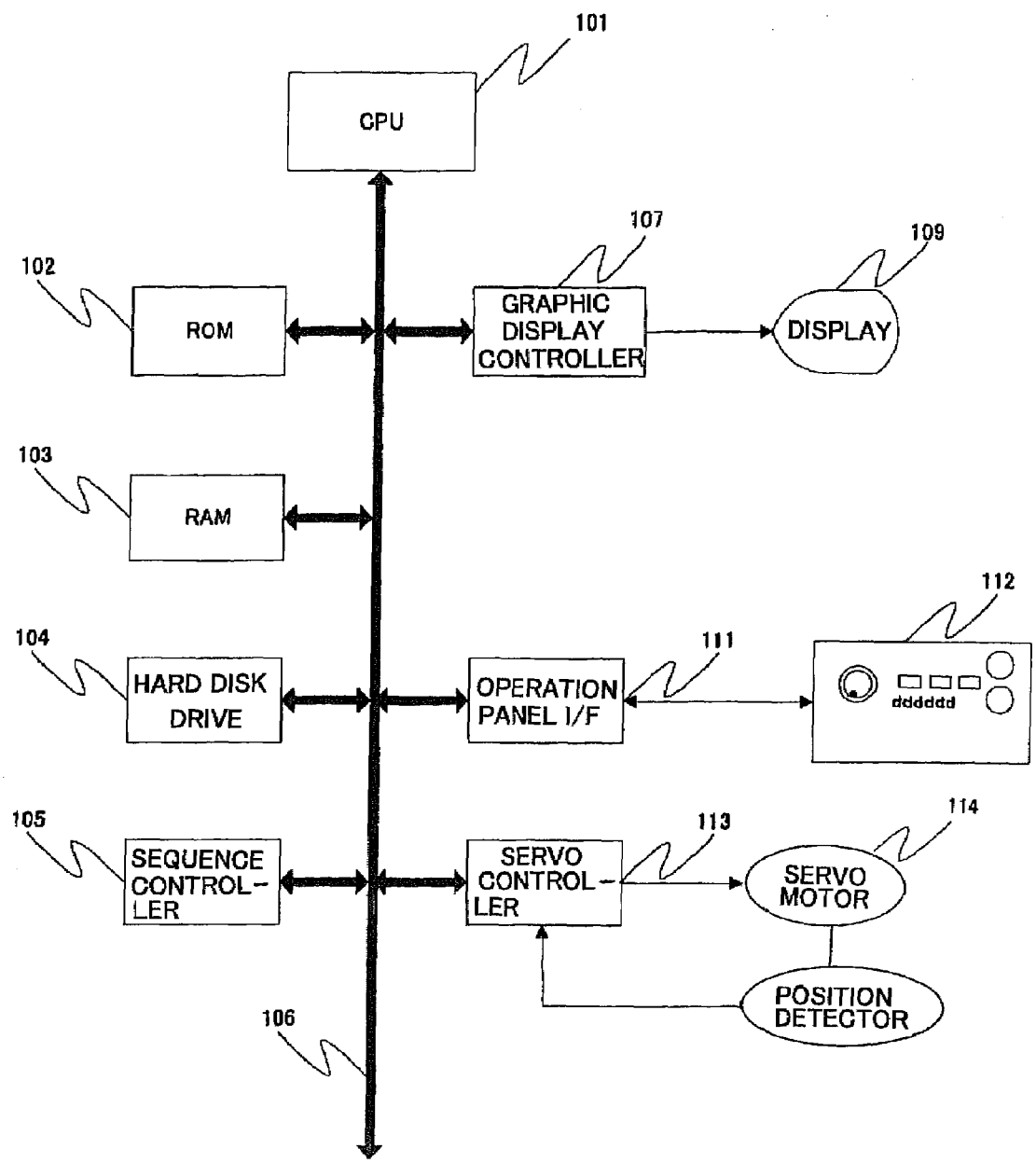
FIG. 13 is a diagram showing a hardware structure of a numerical controller according to a preferred embodiment of the present invention.
Figure 14:
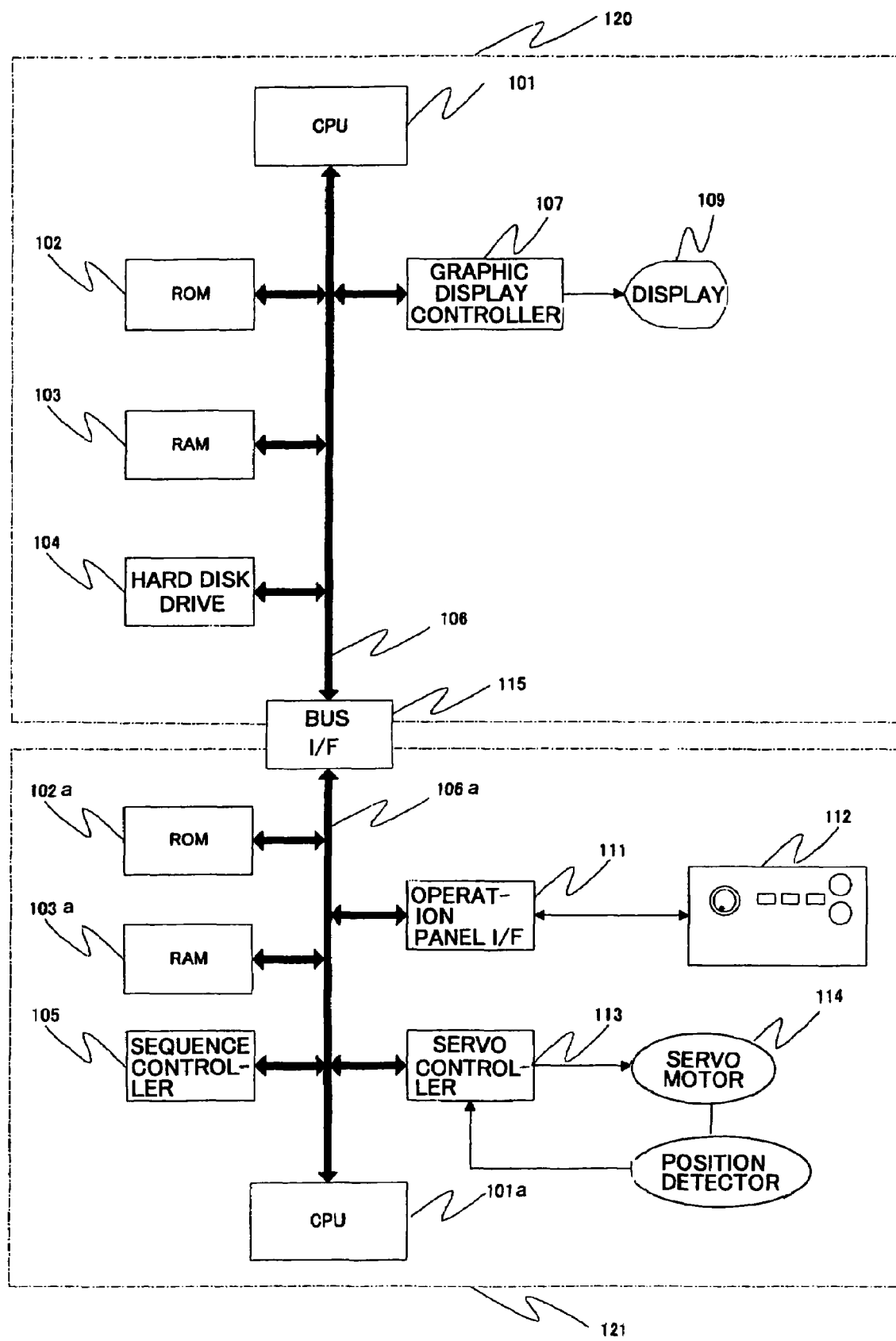
FIG. 14 is a diagram showing a hardware structure of a second numerical controller according to a preferred embodiment of the present invention.

FIGS. 13 and 14 show examples of a hardware structure of a numerical controller which can call a program described in the script language according to a preferred embodiment of the present invention.

In the structure shown in FIG. 13, a CPU (central processing unit) 101 executes various programs stored in a ROM 102 or a hard disk drive 104 using a RAM 103 as a work space. With the execution of the program, the program reader 2, program interpreter 3, function generator 4, script engine 12, NC component unit 13, event detector 14, and common variable storage 15 are realized. A sequence controller 105 corresponds to the PLC controller 8 of FIG. 1 and is a programmable controller which executes the sequence control. A graphic display controller 107 is a circuit which controls a screen display to a display 109, and an operation panel I/F (interface) 111 is an interface circuit for control such as a hardware button and an indicator on an operation panel 112. A servo controller 113 is a hardware circuit corresponding to the servo driver 5 of FIG. 1 and servo-controls a servo motor 114 according to an instruction from the CPU 101 and using a detection signal of a position detector.

The structure of FIG. 13 attempts to simultaneously realize a real time control and a non-real time control by one CPU 101 and can be made by combining a real-time OS (operating system) such as ITRON and a general-purpose OS such as UNIX (registered trademark) and Windows (registered trademark). In this case, it is preferable to realize a calculation control of a portion 22 of FIG. 1 (that is, the program reader 2, program interpreter 3, function generator 4, PLC controller 8, NC component unit 13, event detector 14, and common variable storage 15) in the real-time OS and the calculation control of a portion 21 of FIG. 1 (that is, the script engine unit 12 and NC component unit 13) in the general-purpose OS. With such a structure, a stable operation can be expected with respect to a time limitation under a real-time OS for the program interpretation by G code and wide selection of functions on the general-purpose OS can be easily used in the program described in the script language, enabling increased convenience.

In the structure of FIG. 14, the numerical controller is formed by two separate portions including a portion 120 which is controlled by a general-purpose OS such as UNIX (registered trademark) and Windows (registered trademark) and a portion 121 which is controlled by a real-time OS such as ITRON. The two portions 120 and 121 have CPUs 101 and 101a, ROMs 102 and 102a, and RAMs 103 and 103a, respectively, for executing a program and are connected to each other by a bus I/F 115. In FIG. 14, components identical to those in FIG. 13 are assigned the same reference numerals and will not be described again.

In the structure of FIG. 14, it is preferable that calculation control of the portion 21 of FIG. 1 is realized by the portion 120 controlled by the general-purpose OS and the calculation control of the portion 22 of FIG. 1 is realized by the portion 121 controlled by the real-time OS because of reasons similar to the configuration of FIG. 13. In this case, the operation panel I/F 111 and the servo controller 113 for controlling a machine tool is provided in the portion 121 controlled by the real-time OS. In the portion 120 controlled by the general-purpose OS, on the other hand, a user interface device such as the graphic display controller 107 for controlling the screen display is connected.

The bus I/F 115 may be a common memory or FIFO, or, alternatively, the bus I/F 115 may connect via an RS232C and Ethernet (registered trademark) connection.

Next, the NC component unit 13 in FIG. 1 will be described.

The NC component unit 13 is called from the script engine 12 and executes a function for the numerical control. The function for numerical control has a function name which starts with "nc." such as the nc.SetCommonVar function shown in FIG. 3. When the script engine 12 detects a function having such a function name from a script program to be executed, the script engine 12 calls the function included in the NC component unit 13. The called function of the NC component unit 13 generates a G code instruction according to an argument of the function and sends the G code instruction to the program interpreter 3 to instruct execution of the G code instruction. Among the functions provided by the NC component unit 13, there is a function for manipulating a common variable stored in the common variable storage 15. The common variable is a variable which is common between execution of the numerical control program by the program interpreter 3 and the execution of the script program in the script engine 12.

The NC component unit 13 provides a function of, for example, the following partial program used in the script program of FIG. 3. Among these functions, the function of SetCommonVar provides a function to change a value of the common variable stored in the common variable storage 15, the function of GetCommonVar provides a function to read a value of the stored common variable, and the function of ExecuteBlock provides a function to interpret and execute one block.

nc.SetCommonVar (number, value)
string=nc.GetCommonVar (number)
nc.ExecuteBlock (blockString)

More specifically, in the script exemplified in FIG. 3, the description of:

nc.SetCommonVar (1,feed)

indicates that a content of a variable "feed" is to be substituted into the first of the common variable. The description of:

nc.ExecuteBlock ("G81 Z0 R50 P1 F100")

indicates that a block of numerical control program within the script program is to be executed. In this description, a fixed cycle by a G81 instruction is executed. In the illustrated example, a simple example of a fixed text string is described. However, by utilizing a text string calculating functionality included in the script language, it is also possible to generate and execute a text string of a block which is described in G code using a program described in the script language. For example, in the illustrated example of script of FIG. 3, the description of:

var cycle=nc.GetCommonVar (2);
var block="G" & cycle & "Z0 R50 P1 F" & feed;
nc.ExecuteBlock (block)

indicates a process in which a second value of the common variable is read and substituted into a variable "cycle", a block described in G code is substituted into a variable "block" using the variable "cycle" as a text string operator, and the text string of the variable "block" is interpreted and executed.

The present inventors proposed in Japanese Patent Application No. 2003-343279 "Interfacing method of device driver", which is incorporated herein by reference in its entirety, a device for communication between a real-time OS (the real-time OS operates as a portion of a kernel of a general-purpose OS) and an application section of a general-purpose OS using a component mechanism. As the component mechanism, for example, COM (Component Object Model) provided by Microsoft Corporation may be used. The NC component unit 13 in the present embodiment can easily be realized using the communication device which uses the component mechanism. FIG. 15 is an excerpt of an interface definition (IDL file) of the NC component. In this description, an interface of functions provided by the NC component unit 13 to the script engine is described such as GetCommonVar, ExecuteBlock, etc. The NC component unit 13 is realized by processing the IDL file through an IDL complier to generate a proxy unit and a stub unit and using the proxy unit as a part of software controlled by the general-purpose OS and stub unit as a part of software controlled by the real-time OS. By using this device, expansion of functions by adding a function to the NC component unit 13 is facilitated, enabling a significant increase in the usage range for obtaining data for a real-time unit from the script language and for calling a function.

With a numerical controller according to the present invention in which a program described in a script language can be called from the numerical control program, most functions that can be realized by a script language, such as a function to send mail, a function to access a database and update data therein, a function to display graphics on a screen, and a function to access various functions provided by a numerical controller, can be realized. Because the numerical control programs in the related art cannot perform these functions, the function of the numerical controller can be significantly improved according to the present invention. In addition, because the script language can easily be learned, there is an advantage that a significant number of people can easily customize the numerical controller.

According to a preferred configuration of the present invention, the script program can be started and ended synchronously or asynchronously with the end of the previous block of the numerical control program or the start of the next block of the numerical control program, allowing for processing in both a configuration in which timing is crucial and a configuration in which two processes are to be quickly performed by processing in parallel.

According to another preferred configuration of the present invention, because a program described in the script language can be described mixed in the numerical control program and separated by tags, there is an advantage that a flow of the operations of the numerical control program and the script program can be easily understood.

According to another preferred configuration of the present invention, because a block which is described in a language for describing a numerical control program (for example, G code) can be executed from the script program, it is possible to execute a text string calculated from the program described in the script language as a partial program described in the language for numerical control program. Therefore, there is an advantage that a numerical control program can be automatically generated and executed according to a progress of the numerical control program.

According to another preferred configuration of the present invention, because the structure is realized by separate units of numerical control program interpreter and script engine, there is an advantage that a program described in a script language can be called without significantly changing the numerical control program interpreter of the related art.

According to another preferred configuration of the present invention, because the script engine can generate a plurality of script engine instances, there is an advantage that different script languages can be mixed in one numerical control program including a sub-program.

According to another preferred configuration of the present invention, because a script program can be designated corresponding to an event, there is an advantage that it is possible to execute an operation corresponding to the event such as, for example, execution of a script program such as registering occurrence of the event in a database.

What is claimed is:
1. A numerical controller which controls a machine tool based on a numerical control program, the numerical controller comprising:
a numerical control program execution section which interprets and executes the numerical control program on a per block basis, wherein:

the numerical control program execution section comprises:

a function-generation calculation section which calculates, when a block of the numerical control program is a movement instruction, a function generation mode, and transmits the calculated function generation mode to a function generator;

a script calling section which calls, when a block of the numerical control program is a script calling command, a script program described in a script language corresponding the script calling command; and a script execution section which loads and executes the script program called by the script calling section.

2. A numerical controller according to claim 1, wherein the script calling section is realized as a part of the numerical control program execution section;

the script calling section can recognize one or more predetermined script instructions; and when the script calling section recognizes a script instruction from a numerical control program during execution of the numerical control program, the script calling section calls a script program indicated by a parameter attached to the recognized script instruction.

3. A numerical controller according to claim 2, wherein the one or more predetermined script instructions include at least one of an instruction in an asynchronous start mode in which calling of the script program is started without waiting for completion of a block immediately before the calling of the script program and an instruction in an asynchronous resume mode in which an operation of a block following the block which calls a script program is started before the calling of the script program is completed.

4. A numerical controller according to claim 1, wherein the script calling section is realized as a part of the numerical control program execution section;

the script calling section can recognize a start tag which indicates a start of a script program and an end tag which indicates an end of a script; and when the script calling section recognizes a start tag from a numerical control program during execution of the numerical control program, the script calling section extracts a description from the start tag to a next end tag as a script program and calls the extracted script program.

5. A numerical controller according to claim 1, wherein a script engine section which executes a script program called by the script calling section comprises a section which instructs the numerical control program execution section to execute a partial program described in a language for describing the numerical control program.

6. A numerical controller according to claim 1, wherein a script engine section which executes a script program is provided separately from the numerical control program execution section.

7. A numerical controller according to claim 6, wherein the script engine section can generate a plurality of script engine instances; and a script program which is described in a plurality of different script languages can be called in a numerical control program.

8. A numerical controller according to claim 6, wherein the numerical control program execution section operates on a real-time operating system, and the script engine section operates on a general-purpose operating system.

9. A numerical controller according to claim 8, wherein a function of the numerical control program execution section which operates on the real-time operating system can be called from a script program using a component mechanism.

10. A numerical controller according to claim 1, further comprising:

a script engine section which executes a script program which is called by the script calling section, wherein the script calling section can recognize an event-driven script instruction for registering a script program which operates when an event occurs;

when the script calling section recognizes an even-driven script instruction from the numerical control program, the script calling section recognizes an event and a script program designated in a parameter of the recognized event-driven script instruction and calls the recognized script program with designation of the recognized event as an execution condition; and when an event is designated as an execution condition in the called script program, the script engine section executes the script program when the script engine section receives a notification indicating occurrence of the event.

11. A numerical controller according to claim 10, wherein the event comprises at least one of a time when a numerical control program is selected, a time when execution of the numerical control program is started, a time when execution of the numerical control program is completed, a time when alarm occurs, and a time when reset occurs.

* * * * *